US010453187B2

(12) United States Patent
Peterson et al.

(10) Patent No.: US 10,453,187 B2
(45) Date of Patent: Oct. 22, 2019

(54) SUPPRESSION OF BACKGROUND CLUTTER IN VIDEO IMAGERY

(71) Applicant: THE BOEING COMPANY, Chicago, IL (US)

(72) Inventors: Scott M. Peterson, Albuquerque, NM (US); Dennis J. Yelton, Albuquerque, NM (US)

(73) Assignee: THE BOEING COMPANY, Chicago, IL (US)

( * ) Notice: Subject to any disclaimer, the term of this patent is extended or adjusted under 35 U.S.C. 154(b) by 257 days.

(21) Appl. No.: 15/656,614

(22) Filed: Jul. 21, 2017

(65) Prior Publication Data
US 2019/0026867 A1 Jan. 24, 2019

(51) Int. Cl.
G06K 9/40 (2006.01)
G06T 5/00 (2006.01)
G06T 5/20 (2006.01)

(52) U.S. Cl.
CPC ............... *G06T 5/002* (2013.01); *G06T 5/20* (2013.01); *G06T 2207/10016* (2013.01); *G06T 2207/10032* (2013.01); *G06T 2207/20024* (2013.01); *G06T 2207/20182* (2013.01)

(58) Field of Classification Search
None
See application file for complete search history.

(56) References Cited

U.S. PATENT DOCUMENTS 4,504,908 A * 3/1985 Riederer ............... A61B 6/481
128/922
5,025,143 A * 6/1991 Dayhoff ............... G01S 7/487
250/203.3
(Continued)

FOREIGN PATENT DOCUMENTS

CA 2456252 A1 * 2/2003 ............ G06T 5/002

OTHER PUBLICATIONS

Multidimensional digital filters for—scenes., Hugh L. Kennedy, SPIE, 2014, pp. 063019-1 to 063019-11 (Year: 2014).*
(Continued)

Primary Examiner — Jayesh A Patel
(74) Attorney, Agent, or Firm — Womble Bond Dickinson (US) LLP

(57) ABSTRACT

A method of suppressing background clutter in video imagery of a scene including a foreground target and background clutter includes applying successive images of the video imagery to a clutter suppression process, thereby producing video imagery of a derived scene in which the background clutter is suppressed. This process includes processing the current image to remove a fixed pattern noise associated with the camera, and spatially re-registering the current image to a fixed geolocation or known clutter pattern of the scene in a reference image of the successive images. The process also includes subjecting independent copies of the current image to two infinite impulse response filters having different time constants to produce filtered, time-delayed images, and differencing the filtered images to reduce the background clutter, thereby producing a clutter-suppressed version of the current image in which the background clutter is suppressed with respect to the foreground target.

21 Claims, 6 Drawing Sheets

(56) References Cited

U.S. PATENT DOCUMENTS

| | | | | |
|---|---|---|---|---|
| 5,257,121 | A | * | 10/1993 | Steinberg ............... G06T 5/002 |
| | | | | 348/169 |
| 5,317,395 | A | | 5/1994 | Carr et al. |
| 5,341,142 | A | | 8/1994 | Reis et al. |
| 5,400,161 | A | | 3/1995 | Lambert, Jr. |
| 5,654,549 | A | | 8/1997 | Landecker et al. |
| 5,798,786 | A | | 8/1998 | Lareau et al. |
| 5,894,323 | A | | 4/1999 | Kain et al. |
| 5,903,659 | A | | 5/1999 | Kilgore |
| 6,108,032 | A | | 8/2000 | Hoagland |
| 6,211,515 | B1 | | 4/2001 | Chen et al. |
| 6,373,522 | B2 | | 4/2002 | Mathews et al. |
| 6,590,999 | B1 | * | 7/2003 | Comaniciu ............... G06K 9/32 |
| | | | | 348/416.1 |
| 6,714,240 | B1 | | 3/2004 | Caswell |
| 6,999,634 | B2 | * | 2/2006 | Hong ..................... G06T 5/20 |
| | | | | 348/241 |
| 7,602,944 | B2 | * | 10/2009 | Campbell .......... G06K 9/00778 |
| | | | | 375/240 |
| 7,877,209 | B2 | * | 1/2011 | Harris ..................... B60R 9/04 |
| | | | | 318/445 |
| 7,995,855 | B2 | * | 8/2011 | Albu ....................... G06T 5/20 |
| | | | | 348/674 |
| 8,553,113 | B2 | | 10/2013 | Ansari et al. |
| 8,611,586 | B1 | * | 12/2013 | Brodeur ............... G06K 9/3241 |
| | | | | 382/100 |
| 8,922,674 | B2 | * | 12/2014 | Ranbro .................. H04N 9/735 |
| | | | | 348/223.1 |
| 8,988,536 | B2 | * | 3/2015 | Park ....................... H04N 5/145 |
| | | | | 348/208.6 |
| 9,105,081 | B2 | * | 8/2015 | Wong ..................... G06T 5/20 |
| 9,402,028 | B2 | | 7/2016 | Dopilka |
| 9,449,371 | B1 | * | 9/2016 | Sheng ................... G06T 5/002 |
| 9,501,839 | B1 | * | 11/2016 | Korchev ............... G06T 5/002 |
| 9,646,388 | B2 | | 5/2017 | Paxton et al. |
| 9,648,261 | B2 | * | 5/2017 | Lim ..................... H04N 5/3675 |
| 10,009,579 | B2 | * | 6/2018 | Wang ................. G06K 9/00201 |
| 10,074,282 | B1 | * | 9/2018 | Wilber ................. G08G 5/0021 |
| 10,127,458 | B2 | * | 11/2018 | Singh ................. G06K 9/00785 |
| 2004/0234157 | A1 | * | 11/2004 | Forman ............... G06K 9/3241 |
| | | | | 382/260 |
| 2005/0280707 | A1 | | 12/2005 | Sablak et al. |
| 2006/0251410 | A1 | | 11/2006 | Trutna, Jr. |
| 2008/0118104 | A1 | | 5/2008 | Ariyur et al. |
| 2009/0041297 | A1 | * | 2/2009 | Zhang ................. G06K 9/00362 |
| | | | | 382/103 |
| 2009/0073170 | A1 | * | 3/2009 | Berretty ................... G06K 9/20 |
| | | | | 345/427 |
| 2009/0304246 | A1 | * | 12/2009 | Walker ................ G01S 7/52034 |
| | | | | 382/128 |
| 2010/0188535 | A1 | * | 7/2010 | Mitsuya ................... G06T 5/50 |
| | | | | 348/241 |
| 2011/0194734 | A1 | | 8/2011 | Gensolen et al. |
| 2011/0226955 | A1 | | 8/2011 | Luty et al. |
| 2012/0154579 | A1 | * | 6/2012 | Hampapur ............. G06T 7/215 |
| | | | | 348/143 |
| 2013/0121546 | A1 | * | 5/2013 | Guissin ................ G06T 7/0012 |
| | | | | 382/128 |
| 2013/0177253 | A1 | * | 7/2013 | Batur ..................... H04N 19/80 |
| | | | | 382/236 |
| 2014/0132804 | A1 | * | 5/2014 | Guissin .................. G02B 13/06 |
| | | | | 348/239 |
| 2014/0270568 | A1 | * | 9/2014 | Hutchison ............. G06T 5/002 |
| | | | | 382/264 |
| 2014/0314335 | A1 | * | 10/2014 | McCarthy ............. H04N 5/213 |
| | | | | 382/275 |
| 2014/0328509 | A1 | * | 11/2014 | Guissin ................. G06T 5/002 |
| | | | | 382/100 |
| 2015/0269745 | A1 | * | 9/2015 | Klimer ................... G06T 7/194 |
| | | | | 382/103 |
| 2015/0334398 | A1 | * | 11/2015 | Socek ....................... G06T 7/11 |
| | | | | 375/240.26 |
| 2016/0104072 | A1 | * | 4/2016 | Singh ..................... G06N 7/005 |
| | | | | 706/46 |

OTHER PUBLICATIONS

Extended European Search Report dated Dec. 5, 2018 in European application No. 18179935.4.

Examination Report from corresponding European Patent Appl. No. 18179935.4, dated Aug. 23, 2019.

* cited by examiner

SUPPRESSION OF BACKGROUND CLUTTER IN VIDEO IMAGERY

TECHNOLOGICAL FIELD

The present disclosure relates generally to imaging and tracking and, in particular, to suppression of background clutter in video imagery.

BACKGROUND

Imaging and tracking systems typically include sensors to identify and track objects. For example, some sensors, such as radar systems, send out signals that reflect from objects and are received by the system. Other sensors, such as electro-optical sensors, receive electromagnetic radiation signals from the objects themselves. Improvements in this field have been directed to refining these sensors to be more accurate.

In particular, electro-optical sensors typically use telescopes and focal plane arrays that detect infrared (IR) radiation. Many approaches for autonomous optical detection in environments with clutter depend on combinations of signature enhancement, shape matching and motion detection. These approaches try to exploit differences between an object of interest and background that are presented under the given conditions and scenarios. For example, large temperature differentials between the atmosphere, terrestrial background and the object may allow adaptive thresholding on consecutive detector output arrays to produce consistent exceedances which can then be correlated into high-probability target detections. Performance trades result in requirements for detection and false-alarm-rate probabilities versus sensor hardware, processor architectures and data analysis algorithms.

In the case of space-to-ground surveillance, specific IR bands are employed to optimally match known target signature responses while suppressing those of the background. In some cases, multiple bands are used to take advantage of the difference in responses between them, thus creating multi-channel data sets upon which to discriminate objects of interest from unwanted background clutter.

Cost-effective, surveillance systems looking for small (unresolved), dim (background limited) targets at low-earth orbit ranges require uninterrupted scan processing at frame rates dictated by target signal integration, maximum background radiance levels and mission timelines. Requirements are generally driven by line of sight (LOS) rates and projected pixel sizes, or ground sample distance (GSD). Detection limiting effects associated with these types of systems involve static field-of-view patterns, or fixed pattern noise (FPN), temporal noise (e.g., thermal, photon-shot, digital readout, etc.) and detector pixel imperfections (inoperable pixels) in the IR sensor and suppression of the local background clutter structure that competes with the target signature.

In existing approaches, removing FPN requires a calibration step in which the current pattern is estimated. This usually involves the generation of a "dark frame" in the absence of input producing a frame in which only the FPN component is present. Since FPN patterns can drift over time scales larger than detection processing interval, periodic FPN calibration is required. In space applications, dark frames can be generated by directing the sensor LOS toward empty space and collecting frame sets which are then averaged into an estimate of the current FPN. This process has the effect of impacting timeline continuity, and maneuvering resources.

Temporal noise in the detector is often dealt with by frame integration which tends to average out the noise while strengthening the relatively constant target signature. Effective frame integration requires a registration process that correlates constant background patterns. The registration process can be based on image frame cross-correlation, or by navigation unit data. Integration intervals (and hence the number of frame additions) are set so that the target motion over the period keeps it within a registered pixel where its signature can be accumulated. The result will be a target-plus-background image frame in which pixel noise has been reduced.

The target signature must now be isolated from the background pattern. This is done by subtracting a local estimate of the background as it would appear in the same registered and integrated frame in the absence of the target. In a practical sense, a second integrated frame is generated at a slightly different time where the targets have slightly shifted their positions into different pixels. A difference frame now indicates the presence of moving objects as co-located doublet pulses surrounded by residual background clutter.

The key to detection performance is suppression of the residual clutter to a point that produces Signal-to-Noise Ratios (SNR) suitable for detection and false alarm rate requirements.

BRIEF SUMMARY

Example implementations of the present disclosure are directed to an improved apparatus, method and computer-readable storage medium for suppressing background clutter with respect to a foreground target in video imagery. Example implementations provide a solution to dim target detection in clutter using static structure deconvolution, combined with Infinite Impulse Response (IIR) frame integration and inoperable pixel suppression. In some examples, a first stage estimates and removes FPN with very high accuracy as an on-going process that eliminates the need for periodic dark-frame calibration. IIR integration produces pixel noise suppressed estimates of the surveillance scene for motion detection differencing. Inoperable pixels are removed from the estimation process using a weighted averaging technique based on the constant bad pixel map (BPM) measured from the detector array during system integration.

Example implementations of the present disclosure perform better than existing techniques at removing FPN in cluttered imagery. Likewise, motion compensated IIR filtering uses much less memory during frame integration relative to prior techniques, and allows for different integration time constants, operating in parallel, that focus separately on isolating the background (clutter), foreground (target), and FPN components of the image. Other approaches use more memory and do not use differing time constants to enhance the separation of target, background, and FPN. Moreover, individual bad pixels are identified and removed from the imagery using a statistical process combined with morphological filtering rather than relying on a non-uniformity correction (NUC), which requires external calibration. For IR cameras, the calibration drifts over time, necessitating repeated calibration. Example implementations are auto-calibrating and circumvent the need for external calibration.

The present disclosure thus includes, without limitation, the following example implementations.

Some example implementations provide a method of suppressing background clutter with respect to a foreground target in video imagery, the method comprising receiving video imagery from a camera onboard a moving platform, the video imagery being of a scene including a foreground target and background clutter, the foreground target moving with respect to the background clutter; applying successive images of successive frames of the video imagery to a clutter suppression process and thereby producing video imagery of a derived scene in which the background clutter is suppressed with respect to the foreground target, the clutter suppression process including for each image when a current image of the successive images: processing the current image of the video imagery to remove a fixed pattern noise associated with the camera; spatially re-registering the current image to a fixed geolocation or known clutter pattern of the scene in a reference image of the successive images; thereafter, subjecting independent copies of the current image to two infinite impulse response (IIR) filters having different time constants to produce filtered images that are time-delayed with respect to each other; differencing the filtered images to reduce the background clutter, thereby producing a clutter-suppressed version of the current image in which the background clutter is suppressed with respect to the foreground target; and rendering the video imagery of the derived scene including clutter-suppressed versions of the successive images.

In some example implementations of the method of the preceding or any subsequent example implementation, or any combination thereof, processing the current image includes determining the fixed pattern noise for removal from the current image, and determining the fixed pattern noise includes subjecting a number of the successive images up to and including the current image to an IIR low-pass filter to produce IIR-filtered images in which the background clutter is smoothed into regionally-localized mean values with the fixed pattern noise being unaltered, the IIR-filtered images including an IIR-filtered version of the current image; removing the regionally-localized mean values from the IIR-filtered images and the current image utilizing a spatial convolution operation; removing the DC component from the IIR-filtered version of the current image to produce a DC-removed, IIR-filtered version of the current image; and combining the IIR-filtered images and the current image with the regionally-localized mean values so removed, thereby producing a scaling factor; and, normalizing the DC-removed, IIR-filtered version of the current image using the scaling factor to produce an unbiased estimation of the fixed pattern noise that at least partially matches the fixed pattern noise in the current image.

In some example implementations of the method of any preceding or any subsequent example implementation, or any combination thereof, processing the current image includes performing a pixel-wise subtraction of the fixed pattern noise from the current image and thereby producing a processed image that contains the foreground target and background clutter with reduced or without the fixed pattern noise.

In some example implementations of the method of any preceding or any subsequent example implementation, or any combination thereof, the clutter suppression process further includes applying a bad pixel map to the current image to remove invalid image data from any bad pixels therein, the bad pixel map being applied as the independent copies of the current image are subjected to the two IIR filters.

In some example implementations of the method of any preceding or any subsequent example implementation, or any combination thereof, the successive images are applied to the clutter suppression process at regular intervals and for each of which the method further comprises initializing the clutter suppression process with a particular geolocation of the scene, thereby establishing the reference image and the fixed geolocation or known clutter pattern to which the current image is spatially re-registered.

In some example implementations of the method of any preceding or any subsequent example implementation, or any combination thereof, the clutter suppression process is one of two parallel clutter suppression processes that are identical but alternately initialized at different times, and applying the successive images to the clutter suppression process includes separately and independently applying the successive images to each of the two clutter suppression processes, and wherein the method further comprises composing the video imagery of the derived scene by alternately switching between the two clutter suppression processes.

In some example implementations of the method of any preceding or any subsequent example implementation, or any combination thereof, the successive images are applied to the two clutter suppression processes at respective regular intervals of a number of frames of the video imagery that have an offset of a fraction of the number of frames, and wherein when either of the two clutter suppression processes initializes, composing the clutter-suppressed version of the successive images switches to the other of the two clutter suppression processes in which the two IIR filters have achieved a steady state.

Some example implementations provide an apparatus for suppressing background clutter with respect to a foreground target in video imagery, the apparatus comprising a processor configured to cause the apparatus perform a number of operations, including the apparatus being caused to at least perform the method of any preceding example implementation, or any combination thereof.

Some example implementations provide a computer-readable storage medium for suppressing background clutter with respect to a foreground target in video imagery, the computer-readable storage medium being non-transitory and having computer-readable program code portions stored therein that in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

FIG. 1 schematically illustrates a clutter suppression system, in accordance with example implementations of the present disclosure;

DETAILED DESCRIPTION

Figure 1:
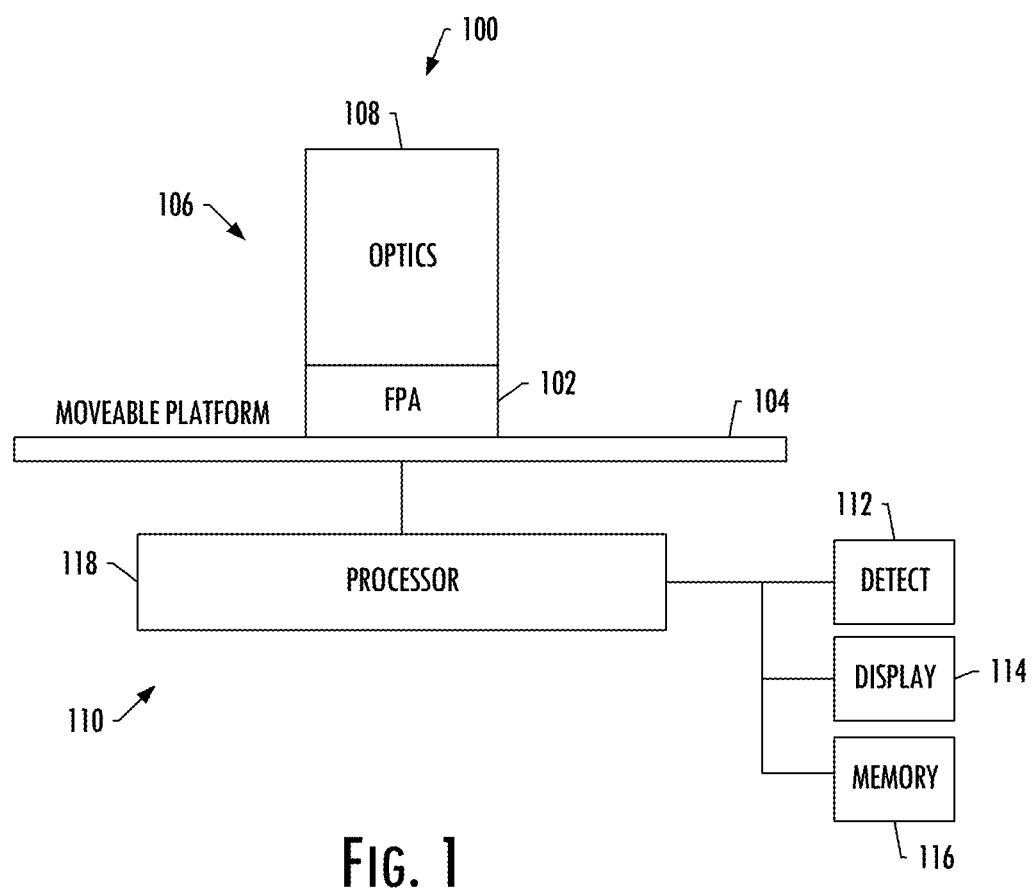

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like. Unless otherwise stated, any one or more, if not all, of these may be absolute or approximate to account for acceptable variations that may occur, such as those due to engineering tolerances or the like. Moreover, it should be understood that steps, operations or functions performed in some examples may be optional or even eliminated in other examples. Like reference numerals refer to like elements throughout.

Example implementations of the present disclosure are directed to imaging and tracking and, in particular, to suppression of clutter in video imagery, and thereby enabling the detection of otherwise very dim or otherwise hard-to-detect targets obscured by the clutter. Example implementations are auto-calibrating, and thereby circumvent the need for external calibration of the camera. In some applications, such as space-based surveillance applications, this can result in tremendous savings of time and resources devoted to camera calibration. Moreover, example implementations utilize a computational approach that requires much less memory than other moving target indicator (MTI) approaches and can be implemented on existing space-qualified hardware. This memory utilization advantage can result in tremendous size weight and power (SWaP) savings in space-based applications.

FIG. 1 schematically illustrates a clutter suppression system 100, in accordance with example implementations of the present disclosure. As shown, in some examples, the clutter suppression system includes an image sensing device such as a focal plane array (FPA) 102 fixedly mounted to a moveable platform 104. Examples of a suitable moveable platform include vehicles such as land vehicles (ground vehicles), rail vehicles, aircraft (air vehicles), spacecraft, watercraft and the like. Other examples of a suitable moveable platform include satellites, missiles, advanced kill vehicles and the like.

In some examples, FPA 102 is a component of a camera 106 or other optical sensor that also includes a set of optics 108. For example, the set of optics may be part of a telescope and include one or more lenses, reflectors or the like. The FPA may include a physical array of detectors configured to detect infrared or other wavelengths focused through the set of optics, and generate focal plane array data—or more particularly video imagery—indicative of the same. For example, the detectors of the focal plane array may comprise long band detectors and/or short band detectors, although other types of detectors, such as visible detectors, may be used.

As also shown, in some examples, the clutter suppression system 100 includes a computing apparatus 110 in communication with the camera 106 and generally configured to suppress background clutter with respect to a foreground target in video imagery from the camera. The computing apparatus is configured to produce video imagery of a derived scene in which the background clutter is suppressed with respect to the foreground target, and render the video imagery of the derived scene for receipt by a target detection processor 112, presentation by a display 114 and/or storage in non-volatile memory 116, any one or more of which may be integrated with or separate from the computing apparatus. The computing apparatus includes one or more of each of one or more components such as a processor 118, one suitable example of which is a field programmable gate array (FPGA). A suitable computing apparatus according to various example implementations is described in greater detail below.

In accordance with example implementations of the present disclosure, the processor 118 is configured to cause the computing apparatus 110 (at times more simply referred to as an "apparatus") to perform a number of operations. In this regard, the apparatus is caused to receive video imagery from the camera 106 onboard the moveable (or moving) platform 104. The video imagery is of a scene including a foreground target and background clutter, the foreground target moving with respect to the background clutter. The apparatus is caused to apply successive images of successive frames of the video imagery to a clutter suppression process and thereby produce video imagery of a derived scene in which the background clutter is suppressed with respect to the foreground target. And the apparatus is caused to render the video imagery of the derived scene including clutter-suppressed versions of the successive images.

Figure 2:
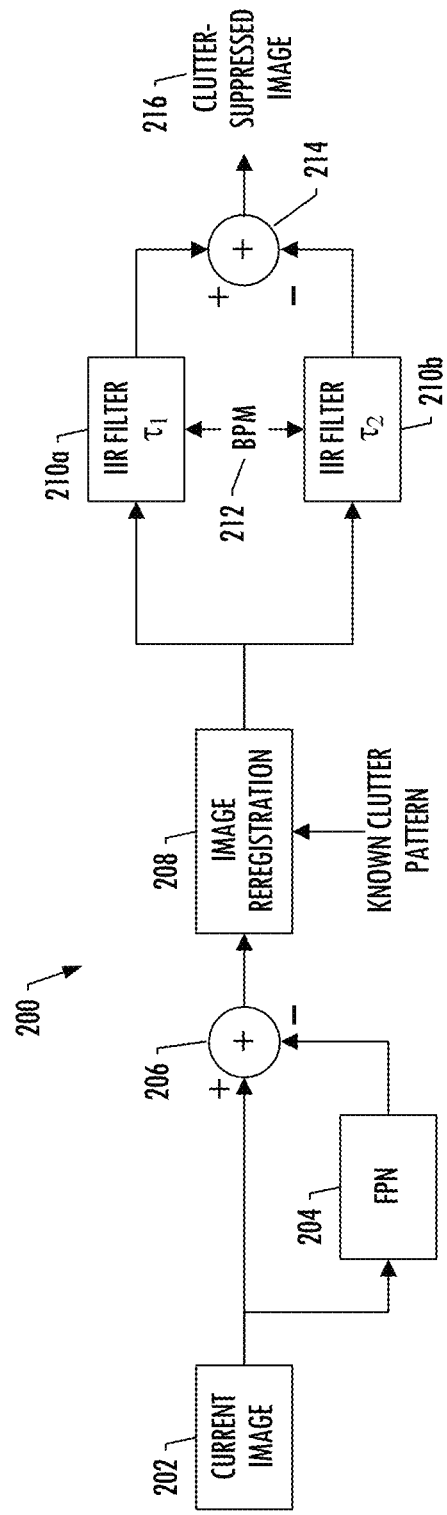
FIG. 2 is a functional block diagram of a clutter suppression process, according to some example implementations.

FIG. 2 is a functional block diagram of the clutter suppression process 200, according to some example implementations of the present disclosure. In some examples, the camera 106 is configured to generate frames of images at a known, constant frame rate of a motion-scanned scene including foreground targets, background clutter with the foreground moving with respect to the background, and an undesired fixed pattern noise (FPN) composed of a constant geometric intensity pattern fixed with the reference to the image frame. According to example implementations, the clutter suppression process includes for each image when a current image of the successive images, the apparatus 110 being caused to at least process the current image 202 of the video imagery to remove the FPN 204 associated with the camera. This may include the apparatus being caused to perform a pixel-wise subtraction 206 of the FPN from the current image and thereby produce a processed image that contains the foreground target and background clutter without the FPN.

As also shown, the clutter suppression process 200 includes the apparatus 110 being caused to spatially re-register 208 the current image to a fixed geolocation or known clutter pattern of the scene in a reference image of the successive images, the known clutter pattern in some examples being terrain corresponding to a fixed geolocation. In some examples, the successive images are applied to the clutter suppression process at regular intervals for each of which the apparatus 110 is further caused to initialize the clutter suppression process 200 with a particular geolocation of the scene and thereby establish the reference image at the fixed geolocation or known clutter pattern to which the current image is spatially re-registered 208. The current image (FPN-removed image) may be re-registered by linear shift interpolation to the inertial frame at the time the clutter suppression process is initialized (or re-initialized). This shift registration process may be performed using a combination of guidance information from the moveable platform 104 and image correlation to achieve an accurate, sub-pixel registration required to maintain the spatial integrity of the unresolved foreground target.

After spatial re-registration 208, the clutter suppression process 200 includes the apparatus 110 being caused to subject independent copies of the current image to two infinite impulse response (IIR) filters 210a, 210b having different time constants $\tau_1$, $\tau_2$ to produce filtered images that are time-delayed with respect to each other. In this manner, the background clutter between the independent copies of the current image may be nearly identical while the location of the foreground target is slightly offset in location between the copies. In some examples, the clutter suppression process further includes the apparatus 110 being caused to apply a bad pixel map (BPM) 212 to the current image to remove invalid image data from any bad pixels therein. In these examples, the BPM is applied as the independent copies of the current image are subjected to the two IIR filters. The apparatus is further caused to difference 214 the filtered images to reduce the background clutter and thereby produce a clutter-suppressed version 216 of the current image in which the background clutter is suppressed with respect to the foreground target. In some examples, the two IIR filtered images are differenced in a pixel-wise manner to thereby subtract out the background clutter while leaving the location-shifted foreground target unaltered.

In some examples, the apparatus 110 being caused to process the current image 202 to remove the FPN 204 includes being caused to determine the FPN for removal from the current image. More particularly, in some examples, the apparatus being caused to determine the FPN includes being caused to at least subject a number of the successive images up to and including the current image to an IIR low-pass filter to produce IIR-filtered images in which the background clutter is smoothed into regionally-localized mean values with the FPN being unaltered. The IIR-filtered images include an IIR-filtered version of the current image.

In the above examples, determination of the FPN also includes apparatus 110 being caused to remove the regionally-localized mean values from the IIR-filtered images and the current image utilizing a spatial convolution operation. The apparatus is further caused to remove the DC component from the IIR-filtered version of the current image to produce a DC-removed, IIR-filtered version of the current image. In some examples, the spatial convolution utilizes a convolution kernel chosen according to a known geometric structure of the FPN. The apparatus is caused to combine the IIR-filtered images and the current image with the regionally-localized mean values so removed, to thereby produce a scaling factor. The apparatus is caused normalize the DC-removed, IIR-filtered version of the current image using the scaling factor to produce an unbiased estimation of the FPN that at least partially (if not best) matches (in a least-squares sense) the FPN in the current image.

Figure 3:
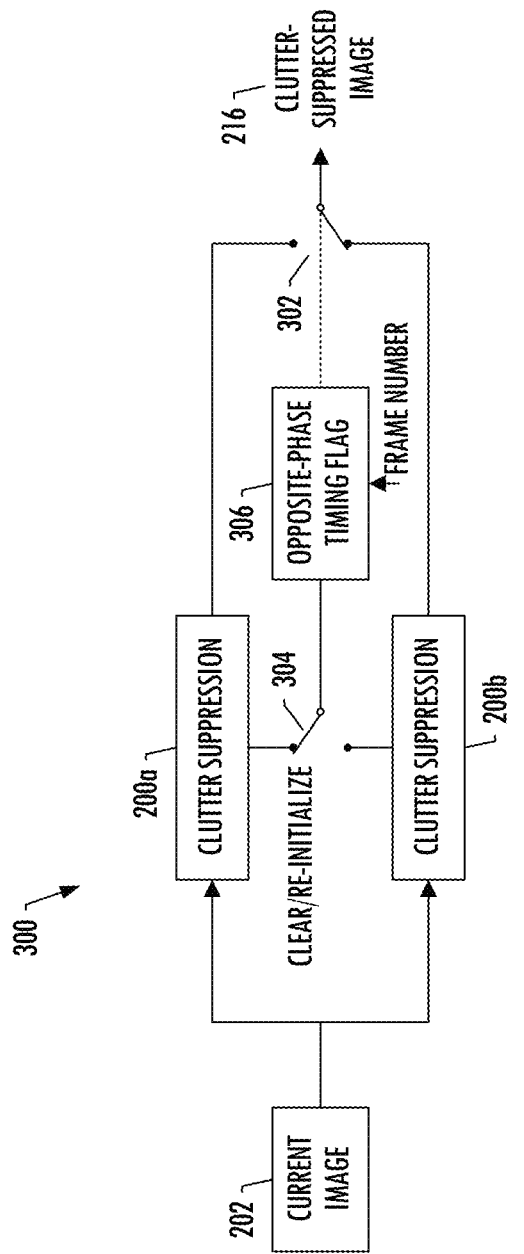
FIG. 3 is a functional block diagram of a further example implementation including two parallel clutter suppression processes that are identical but alternately initialized at different times.

Because the current image is re-registered 208 to a single, static geolocation over the course of the IIR filter realization, the clutter suppression process 200 may have a limited valid duration. To account for movement of the platform 104, in some further examples, the clutter suppression process 200 is one of two parallel clutter suppression processes that are identical but alternately initialized at different times. This is shown in FIG. 3, which illustrates an example implementation 300 including parallel clutter suppression processes 200a, 200b. In these further examples, the apparatus 110 being caused to apply the successive images to the clutter suppression process includes being caused to separately and independently apply the successive images to each of the two clutter suppression processes. Also in these examples, the processor 118 is further configured to cause the apparatus to compose the video imagery of the derived scene by alternately switching 302 between the two clutter suppression processes.

In some even further examples, the successive images are applied to the two clutter suppression processes 200a, 200b at respective regular intervals of a number of frames of the video imagery that have an offset of a fraction of the number of frames. In these even further examples, when either of the two clutter suppression processes initializes 304, the apparatus 110 being caused to compose the clutter-suppressed version of the successive images includes a switch 302 to the other of the two clutter suppression processes in which the two IIR filter within 210a or 210b has achieved a steady state.

The above alternate switching is illustrated in FIG. 3 by an opposite-phase timing flag 306 that is triggered by frame number and oppositely causes one of the two clutter suppression processes 200a, 200b to re-initialize, and the other of the two clutter suppression processes (with steady state IIR filters) to output clutter-suppressed versions of the successive images for rendering. In some examples, then, each of the two clutter suppression processes has a duration of N frames (e.g., N=150). Each of the two processes re-initializes after N frames, but the opposite-phase timing flag clears and re-initializes one of the two processes after some fraction of N (e.g., N/2) via process switching. In this manner, the one of the two processes that is switched to output has achieved a steady state IIR operation for current scene rendering.

Figure 4:
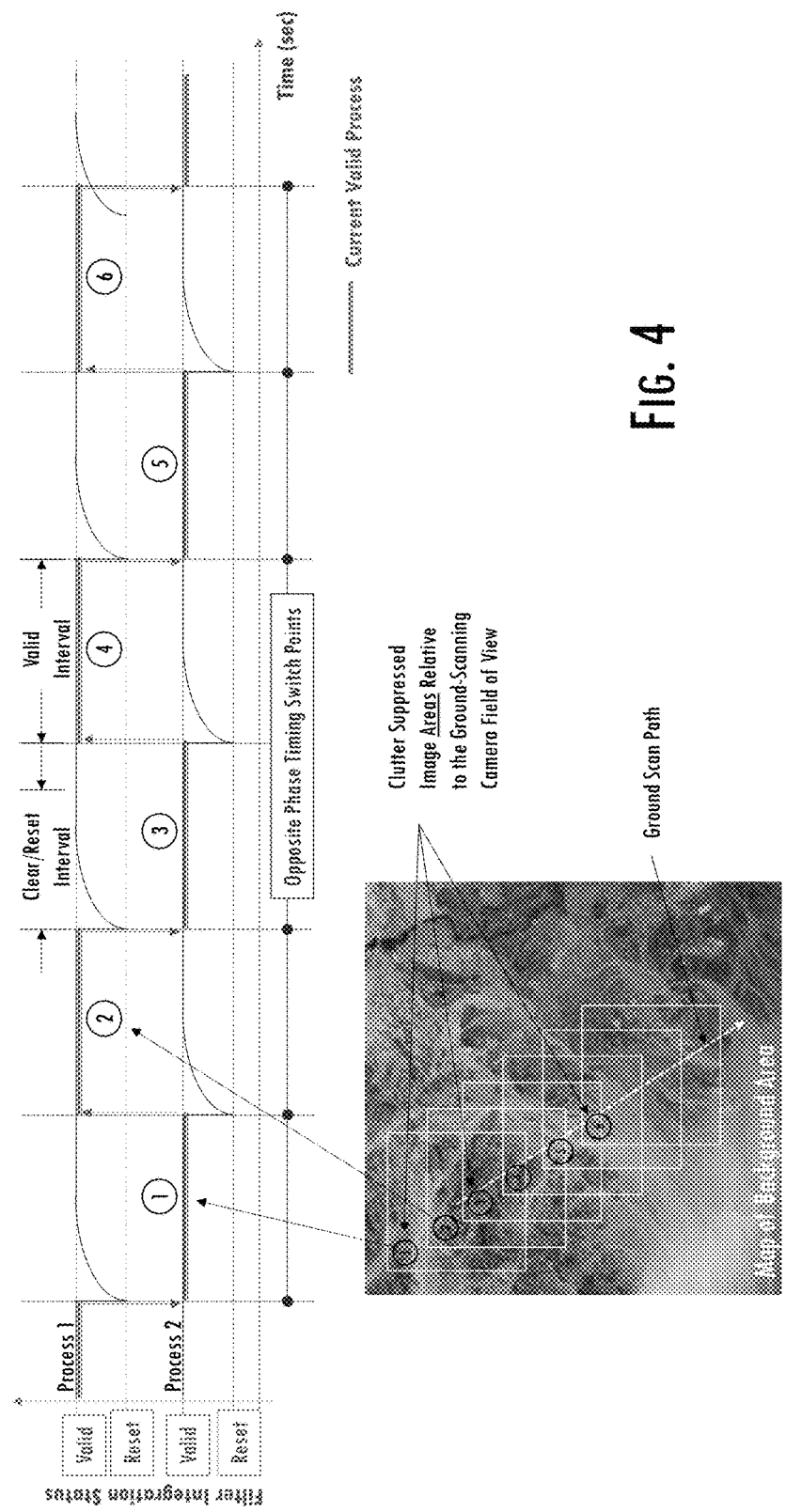
FIG. 4 illustrates timing between the two clutter suppression processes of FIG. 3, according to some example implementations.

To further illustrate example implementations of the above, FIG. 4 illustrates the timing between the two clutter suppression processes including one re-initializing and building its IIR filters to a steady state (valid), while the other has achieved a steady state (valid) and outputs clutter-suppressed versions for rendering, both images are received from the camera 106 on the moving (moveable) platform 104, according to some examples.

Figure 5:
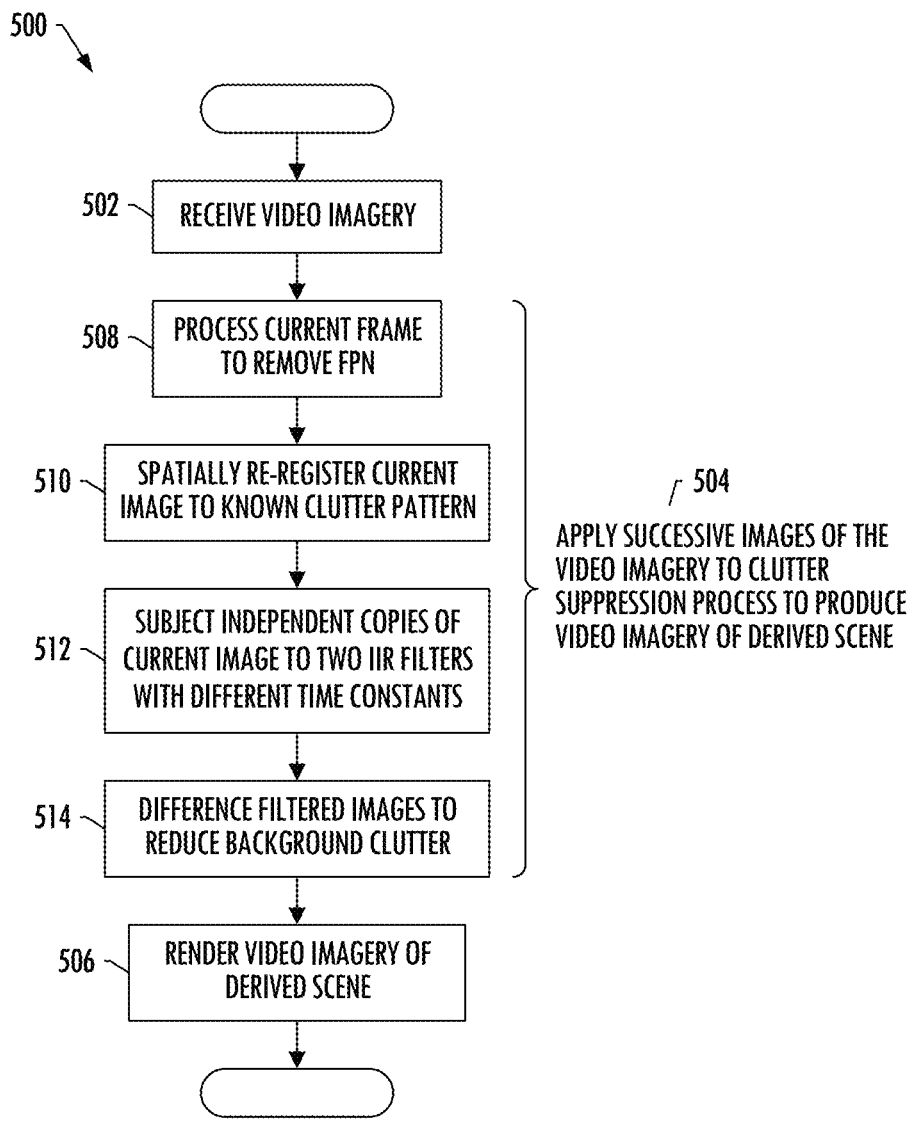
FIG. 5 illustrates a flowchart including various operations of a method of suppressing background clutter with respect to a foreground target in video imagery, according to some example implementations.

FIG. 5 illustrates a flowchart including various operations of a method 500 of suppressing background clutter with respect to a foreground target in video imagery, according to some example implementations of the present disclosure. As shown at block 502, the method includes receiving video imagery from a camera 106 onboard a moving platform 104. The video imagery is of a scene including a foreground target and background clutter, the foreground target moving with respect to the background clutter. As shown at 504, the method includes applying successive images of successive frames of the video imagery to a clutter suppression process, thereby producing video imagery of a derived scene in which the background clutter is suppressed with respect to the foreground target. As shown at block 506, the method includes rendering the video imagery of the derived scene including clutter-suppressed versions of the successive images.

The clutter suppression process at 504 includes for each image when the image is a current image of the successive images, processing the current image of the video imagery to remove a fixed pattern noise associated with the camera, as shown at block 508. The process includes spatially re-registering the current image to a fixed geolocation or known clutter pattern of the scene (e.g., terrain corresponding to a fixed geolocation of the scene) in a reference image of the successive images, as shown at block 510. The process thereafter includes subjecting independent copies of the current image to two infinite impulse response (IIR) filters having different time constants to produce filtered images that are time-delayed with respect to each other, as shown at block 512. The process includes differencing the filtered images to reduce the background clutter, thereby producing a clutter-suppressed version of the current image in which the background clutter is suppressed with respect to the foreground target, as shown at block 514.

As explained above, the computing apparatus 110 includes one or more of each of one or more components such as a processor 118, one suitable example of which is an FPGA. In some examples, the processor is implemented using FPGAs for most of the image processing because of their ability to quickly and efficiently perform many image processing operations. This type of hardware implementation is very appropriate for real-time clutter suppression in high-speed video imagery, but it is not the only possible hardware implementation. The computing apparatus may, in fact, be implemented by various means, including in hardware, alone or under direction of one or more computer programs from a computer-readable storage medium. In some example implementations, the computing apparatus includes and makes extensive use of graphics processing units (GPUs), which are designed to process many coordinate transformations in parallel and are, therefore, a natural fit.

In some examples, one or more apparatuses may be provided that are configured to function as or otherwise implement the computing apparatus 110 shown and described herein. In examples involving more than one apparatus, the respective apparatuses may be connected to, or otherwise may be in communication with, one another in a number of different manners, such as directly or indirectly via a wired or wireless network or the like.

Figure 6:
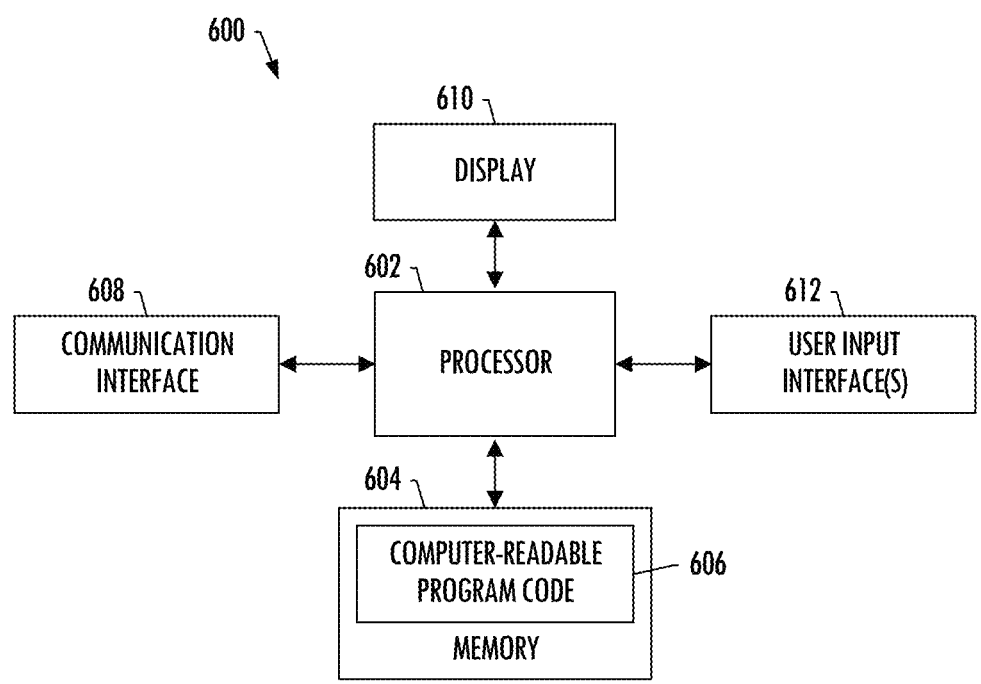
FIG. 6 illustrates an apparatus that may correspond to the computing apparatus according to some example implementations.

FIG. 6 more particularly illustrates an apparatus 600 that in some examples may correspond to the computing apparatus 110. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 602 (e.g., processor 118) connected to a memory 604 (e.g., storage device).

The processor 602 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit is, at times, more commonly referred to as a "chip"). The processor may be configured to execute computer programs, which may be stored onboard the processor or otherwise stored in the memory 604 (of the same or another apparatus).

The processor 602 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), FPGAs or the like. Thus, although the processor may be capable of executing a computer program to perform one or more functions, the processor of various examples may be capable of performing one or more functions without the aid of a computer program.

The memory 604 is generally any piece of computer hardware that is capable of storing information such as, for example, data, computer programs (e.g., computer-readable program code 606) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communication interface 608 (e.g., communications unit) and/or one or more user interfaces. The communication interface may be configured to transmit and/or receive information, such as to and/or from other apparatus(es), network(s) or the like. The communication interface may be configured to transmit and/or receive information by physical (wired) and/or wireless communications links. Examples of suitable communication interfaces include a network interface controller (NIC), wireless NIC (WNIC) or the like.

The user interfaces may include a display 610 (e.g., display 114) and/or one or more user input interfaces 612 (e.g., input/output unit). The display may be configured to present or otherwise display information to a user, suitable examples of which include a liquid crystal display (LCD), light-emitting diode display (LED), plasma display panel (PDP) or the like.

The user input interfaces 612 may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 600 may include a processor 602 and a computer-readable storage medium or memory 604 coupled to the processor, where the processor is configured to execute computer-readable program code 606 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for suppressing background clutter with respect to a foreground target in video imagery, the apparatus comprising:
   a processor configured to at least:
   receive video imagery from a camera onboard a moving platform, the video imagery being of a scene including a foreground target and background clutter, the foreground target moving with respect to the background clutter;
   apply successive images of successive frames of the video imagery to a clutter suppression process and thereby produce video imagery of a derived scene in which the background clutter is suppressed with respect to the foreground target, the clutter suppression process including for each image when a current image of the successive images:
   process the current image of the video imagery to remove a fixed pattern nose associated with the camera;
   spatially re-register the current image to a fixed geo-location or known clutter pattern of the scene in a reference image of the successive images; thereafter,
   subject independent copies of the current image to two infinite impulse response (IIR) filters having different time constants to produce filtered images that are time-delayed with respect to each other;
   difference the filtered images to reduce the background clutter, thereby produce a clutter-suppressed version of the current image in which the background clutter is suppressed with respect to the foreground target; and
   render the video imagery of the derived scene including clutter-suppressed versions of the successive images.

2. The apparatus of claim 1, wherein process the current image includes the processor further configured to determine the fixed pattern noise for removal from the current image, and determine the fixed pattern noise includes the processor further configured to at least:

subject a number of the successive images up to and including the current image to an IIR low-pass filter to produce IIR-filtered images in which the background clutter is smoothed into regionally-localized mean values with the fixed pattern noise being unaltered, the IIR-filtered images including an IIR-filtered version of the current image;

remove the regionally-localized mean values from the IIR-filtered images and the current image utilizing a spatial convolution operation;

remove the DC component from the IIR-filtered version of the current image to produce a DC-removed, IIR-filtered version of the current image; and combine the IIR-filtered images and the current image with the regionally-localized mean values so removed, and thereby produce a scaling factor; and normalize the DC-removed, IIR-filtered version of the current image using the scaling factor to produce an unbiased estimation of the fixed pattern noise that at least partially matches the fixed pattern noise in the current image.

3. The apparatus of claim 1, wherein process the current image includes the processor further configured to perform a pixel-wise subtraction of the fixed pattern noise from the current image and thereby produce a processed image that contains the foreground target and background clutter with reduced or without the fixed pattern noise.

4. The apparatus of claim 1, wherein the clutter suppression process further includes the processor further configured to apply a bad pixel map to the current image to remove invalid image data from any bad pixels therein, the bad pixel map being applied as the independent copies of the current image are subjected to the two IIR filters.

5. The apparatus of claim 1, wherein the successive images are applied to the clutter suppression process at regular intervals and for each of which the processor is further configured to initialize the clutter suppression process with a particular geolocation of the scene, thereby establishing the reference image and the fixed geolocation or known clutter pattern to which the current image is spatially re-registered.

6. The apparatus of claim 5, wherein the clutter suppression process is one of two parallel clutter suppression processes that are identical but alternately initialized at different times, and apply the successive images to the clutter suppression process includes the processor further configured to separately and independently apply the successive images to each of the two clutter suppression processes, and
wherein the processor is further configured to compose the video imagery of the derived scene by alternately switching between the two clutter suppression processes.

7. The apparatus of claim 6, wherein the successive images are applied to the two clutter suppression processes at respective regular intervals of a number of frames of the video imagery that have an offset of a fraction of the number of frames, and wherein when either of the two clutter suppression processes initializes, compose the clutter-suppressed version of the successive images includes a switch to the other of the two clutter suppression processes in which the two IIR filters have achieved a steady state.

8. A method of suppressing background clutter with respect to a foreground target in video imagery, the method comprising:
receiving video imagery from a camera onboard a moving platform, the video imagery being of a scene including a foreground target and background clutter, the foreground target moving with respect to the background clutter;

applying successive images of successive frames of the video imagery to a clutter suppression process and thereby producing video imagery of a derived scene in which the background clutter is suppressed with respect to the foreground target, the clutter suppression process including for each image when a current image of the successive images:

processing the current image of the video imagery to remove a fixed pattern noise associated with the camera;

spatially re-registering the current image to a fixed geolocation or known clutter pattern of the scene in a reference image of the successive images; thereafter, subjecting independent copies of the current image to two infinite impulse response (IIR) filters having different time constants to produce filtered images that are time-delayed with respect to each other;

differencing the filtered images to reduce the background clutter, thereby producing a clutter-suppressed version of the current image in which the background clutter is suppressed with respect to the foreground target; and rendering the video imagery of the derived scene including clutter-suppressed versions of the successive images.

9. The method of claim 8, wherein processing the current image includes determining the fixed pattern noise for removal from the current image, and determining the fixed pattern noise includes:

subjecting a number of the successive images up to and including the current image to an IIR low-pass filter to produce IIR-filtered images in which the background clutter is smoothed into regionally-localized mean values with the fixed pattern noise being unaltered, the IIR-filtered images including an IIR-filtered version of the current image;

removing the regionally-localized mean values from the IIR-filtered images and the current image utilizing a spatial convolution operation;

removing the DC component from the IIR-filtered version of the current image to produce a DC-removed, IIR-filtered version of the current image; and combining the IIR-filtered images and the current image with the regionally-localized mean values so removed, and thereby producing a scaling factor; and normalizing the DC-removed, IIR-filtered version of the current image using the scaling factor to produce an unbiased estimation of the fixed pattern noise that at least partially matches the fixed pattern noise in the current image.

10. The method of claim 8, wherein processing the current image includes performing a pixel-wise subtraction of the fixed pattern noise from the current image and thereby producing a processed image that contains the foreground target and background clutter with reduced or without the fixed pattern noise.

11. The method of claim 8, wherein the clutter suppression process further includes applying a bad pixel map to the current image to remove invalid image data from any bad pixels therein, the bad pixel map being applied as the independent copies of the current image are subjected to the two IIR filters.

12. The method of claim 8, wherein the successive images are applied to the clutter suppression process at regular intervals and for each of which the method further comprises initializing the clutter suppression process with a particular geolocation of the scene, thereby establishing the reference image and the fixed geolocation or known clutter pattern to which the current image is spatially re-registered.

13. The method of claim 12, wherein the clutter suppression process is one of two parallel clutter suppression processes that are identical but alternately initialized at different times, and applying the successive images to the clutter suppression process includes separately and independently applying the successive images to each of the two clutter suppression processes, and
wherein the method further comprises composing the video imagery of the derived scene by alternately switching between the two clutter suppression processes.

14. The method of claim 13, wherein the successive images are applied to the two clutter suppression processes at respective regular intervals of a number of frames of the video imagery that have an offset of a fraction of the number of frames, and
wherein when either of the two clutter suppression processes initializes, composing the clutter-suppressed version of the successive images switches to the other of the two clutter suppression processes in which the two IIR filters have achieved a steady state.

15. A non-transitory computer-readable storage medium for suppressing background clutter with respect to a foreground target in video imagery, the non-transitory computer-readable storage medium having computer-readable program code portions stored therein that in response to execution by a processor, cause an apparatus to at least:
receive video imagery from a camera onboard a moving platform, the video imagery being of a scene including a foreground target and background clutter, the foreground target moving with respect to the background clutter;
apply successive images of successive frames of the video imagery to a clutter suppression process and thereby produce video imagery of a derived scene in which the background cutter is suppressed with respect to the foreground target, the clutter suppression process including for each image when a current image of the successive images:
process the current image of the video imagery to remove a fixed pattern noise associated with the camera;
spatially re-register the current image to a fixed geolocation or known clutter pattern of the scene in a reference image of the successive images; thereafter,
subject independent copies of the current image to two infinite impulse response (IIR) filters having different time constants to produce filtered images that are time-delayed with respect to each other;
difference the filtered images to reduce the background clutter, thereby produce a clutter-suppressed version of the current image in which the background clutter is suppressed with respect to the foreground target; and
render the video imagery of the derived scene including clutter-suppressed versions of the successive images.

16. The non-transitory computer-readable storage medium of claim 15, wherein process the current image includes the apparatus further caused to determine the fixed pattern noise for removal from the current image, and determine the fixed pattern noise includes the apparatus further caused to at least:
subject a number of the successive images up to and including the current image to an IIR low-pass filter to produce IIR-filtered images in which the background clutter is smoothed into regionally-localized mean values with the fixed pattern noise being unaltered, the IIR-filtered images including an IIR-filtered version of the current image;
remove the regionally-localized mean values from the IIR-filtered images and the current image utilizing a spatial convolution operation;
remove the DC component from the IIR-filtered version of the current image to produce a DC-removed, IIR-filtered version of the current image; and
combine the IIR-filtered images and the current image with the regionally-localized mean values so removed, and thereby produce a scaling factor; and
normalize the DC-removed, IIR-filtered version of the current image using the scaling factor to produce an unbiased estimation of the fixed pattern noise that at least partially matches the fixed pattern noise in the current image.

17. The non-transitory computer-readable storage medium of claim 15, wherein process the current image includes the apparatus further caused to perform a pixel-wise subtraction of the fixed pattern noise from the current image and thereby produce a processed image that contains the foreground target and background clutter with reduced or without the fixed pattern noise.

18. The non-transitory computer-readable storage medium of claim 15, wherein the clutter suppression process further includes the apparatus further caused to apply a bad pixel map to the current image to remove invalid image data from any bad pixels therein, the bad pixel map being applied as the independent copies of the current image are subjected to the two IIR filters.

19. The non-transitory computer-readable storage medium of claim 15, wherein the successive images are applied to the clutter suppression process at regular intervals and for each of which the apparatus is further caused to initialize the clutter suppression process with a particular geolocation of the scene, thereby establishing the reference image and the fixed geolocation or known clutter pattern to which the current image is spatially re-registered.

20. The non-transitory computer-readable storage medium of claim 19, wherein the clutter suppression process is one of two parallel clutter suppression processes that are identical but alternately initialized at different times, and apply the successive images to the clutter suppression process includes the apparatus further caused to separately and independently apply the successive images to each of the two clutter suppression processes, and wherein the non-transitory computer-readable storage medium has computer-readable program code portions stored therein that in response to execution by the processor, cause the apparatus to further compose the video imagery of the derived scene by alternately switching between the two clutter suppression processes.

21. The non-transitory computer-readable storage medium of claim 20, wherein the successive images are applied to the two clutter suppression processes at respective regular intervals of a number of frames of the video imagery that have an offset of a fraction of the number of frames, and wherein when either of the two clutter suppression processes initializes, compose the clutter-suppressed version of the successive images includes a switch to the other of the two clutter suppression processes in which the two IIR filters have achieved a steady state.

* * * * *

UNITED STATES PATENT AND TRADEMARK OFFICE
CERTIFICATE OF CORRECTION

PATENT NO. : 10,453,187 B2  
APPLICATION NO. : 15/656614  
DATED : October 22, 2019  
INVENTOR(S) : Scott M. Peterson et al.

Page 1 of 1

It is certified that error appears in the above-identified patent and that said Letters Patent is hereby corrected as shown below:

In the Claims

In Column 12, Claim 1, Line 47, "fixed pattern nose" should read -- fixed pattern noise --

In Column 15, Claim 15, Line 38, "background cutter" should read -- background clutter --

Signed and Sealed this  
Seventh Day of April, 2020

Andrei Iancu  
*Director of the United States Patent and Trademark Office*